United States Patent
Devlin et al.

(10) Patent No.: US 11,284,735 B2
(45) Date of Patent: Mar. 29, 2022

(54) BREW HEAD ASSEMBLY

(71) Applicant: Rockwell Collins, Inc., Cedar Rapids, IA (US)

(72) Inventors: Byron A. Devlin, Kansas City, MO (US); Keevin P. Stutheit, Olathe, KS (US); Mudar Abu-Saymeh, Olathe, KS (US); Keith R. DeBald, Gardner, KS (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 382 days.

(21) Appl. No.: 16/234,259

(22) Filed: Dec. 27, 2018

(65) Prior Publication Data
US 2020/0205602 A1 Jul. 2, 2020

(51) Int. Cl.
*A47J 31/36* (2006.01)
*A47J 31/40* (2006.01)
*A47J 31/06* (2006.01)

(52) U.S. Cl.
CPC ....... *A47J 31/3685* (2013.01); *A47J 31/0647* (2013.01); *A47J 31/3623* (2013.01); *A47J 31/407* (2013.01); *A47J 31/0668* (2013.01); *A47J 31/3676* (2013.01)

(58) Field of Classification Search
CPC .............. A47J 31/0647; A47J 31/0668; A47J 31/3623; A47J 31/3633; A47J 31/3676
USPC ........................................ 99/284, 295, 302 P
See application file for complete search history.

(56) References Cited

U.S. PATENT DOCUMENTS

| | | | | |
|---|---|---|---|---|
| 6,026,732 A | * | 2/2000 | Kollep | A47J 31/0668 99/295 |
| 6,499,388 B2 | * | 12/2002 | Schmed | A47J 31/3623 99/295 |
| 7,216,582 B2 | * | 5/2007 | Yoakim | A47J 31/0668 99/295 |
| 7,562,618 B2 | * | 7/2009 | Jarisch | A47J 31/3633 99/289 R |
| 10,918,237 B2 | * | 2/2021 | Bolognese | A47J 31/3695 |
| 2004/0005384 A1 | | 1/2004 | Cai | |
| 2006/0266222 A1 | | 11/2006 | Hammad | |
| 2006/0266225 A1 | | 11/2006 | Hammad | |

(Continued)

OTHER PUBLICATIONS

Search Report dated May 14, 2020 for EP Patent Application No. 19216256.8.

*Primary Examiner* — Reginald Alexander
(74) *Attorney, Agent, or Firm* — Suiter Swantz pc llo

(57) ABSTRACT

A brew head assembly insertable within a brewing apparatus dimensioned to fit within a compartment in a galley of an aircraft may include an adjustable assembly and a brew cup. The adjustable assembly may include a brew head and a support member. The support member may define a first brew head cavity. The brew head may be at least partially inserted into the first brew head cavity. The adjustable assembly may be actuatable between an open position and at least one closed position. The brew cup may define a second brew head cavity. The brew head may be at least partially inserted into the second brew head cavity. A height between the brew head and the brew cup when the adjustable assembly is in the at least one closed position may be responsive to one or more parameters of a brew pod of a plurality of brew pods.

20 Claims, 6 Drawing Sheets

(56) References Cited

U.S. PATENT DOCUMENTS

2008/0095903 A1  4/2008  Weijers
2008/0121111 A1  5/2008  Paget et al.

\* cited by examiner

BREW HEAD ASSEMBLY

BACKGROUND OF THE INVENTION

Select brewing apparatuses utilized in aircraft and aerospace applications are designed to accept brew pods. Although the pods are considered to be "standard," there is often variance in the size and shape of the brew pods. The variance in the size and shape of the brew pod may be caused by a variation in other components of the select brewing apparatuses, variation in customer-supplied brew pods, (e.g., brand type, bean grind, packing of the grounds), and variation in the methods of receiving brew pods incorporated into the select brewing apparatuses.

The variance in the brew pods may affect how the brew pods sit in a brew cavity defined within a brew chamber of the select brewing apparatuses. An incorrectly-seated brew pod may alter the pressure within the brew cavity, which may subsequently cause a deviation from parameters (e.g., time to brew, temperature of brew, taste, or the like) necessary to produce a particular brewed product (e.g., coffee, espresso, tea, or the like). In this regard, variance in the brew pods may affect the type and/or quality of the brew.

SUMMARY

In one aspect, the inventive concepts disclosed herein are directed to a brew head assembly. The brew head assembly may include an adjustable assembly. The adjustable assembly may include a brew head. The adjustable assembly may include a support member. The support member may define a first brew head cavity. The brew head may be at least partially inserted into the first brew head cavity. The adjustable assembly may be actuatable between an open position and at least one closed position. The brew head assembly may include a brew cup. The brew cup may define a second brew head cavity. The brew head may be at least partially inserted into the second brew head cavity. A height between the brew head and the brew cup when the adjustable assembly is in the at least one closed position may be responsive to one or more parameters of a brew pod of a plurality of brew pods. The brew head assembly may be insertable within a brewing apparatus dimensioned to fit within a compartment in a galley of an aircraft.

In a further aspect, the inventive concepts disclosed herein are directed to a brew head assembly. The brew head assembly may include an adjustable assembly. The adjustable assembly may include a brew head. The adjustable assembly may include a support member. The support member may define a first brew head cavity. The brew head may be at least partially inserted into the first brew head cavity. The adjustable assembly may be actuatable between an open position and at least one closed position. The brew head assembly may include a brew cup. The brew cup may define a second brew head cavity. The brew head may be at least partially inserted into the second brew head cavity. A height between the brew head and the brew cup when the adjustable assembly is in the at least one closed position may be responsive to one or more parameters of a brew pod of a plurality of brew pods. The brew head assembly may be insertable within a brewing apparatus dimensioned to fit within a vehicle.

In a further aspect, the inventive concepts disclosed herein are directed to a brew head assembly. The brew head assembly may include an adjustable assembly. The adjustable assembly may include a brew head. The adjustable assembly may include a support member. The support member may define a first brew head cavity. The brew head may be at least partially inserted into the first brew head cavity. The adjustable assembly may be actuatable between an open position and at least one closed position. The brew head assembly may include a brew cup. The brew cup may define a second brew head cavity. The brew head may be at least partially inserted into the second brew head cavity. A height between the brew head and the brew cup when the adjustable assembly is in the at least one closed position may be responsive to one or more parameters of a brew pod of a plurality of brew pods. The brew head assembly may be insertable within a brewing apparatus.

It is to be understood that both the foregoing general description and the following detailed description are exemplary and explanatory only and are not necessarily restrictive of the present disclosure. The accompanying drawings, which are incorporated in and constitute a part of the characteristic, illustrate subject matter of the disclosure. Together, the descriptions and the drawings serve to explain the principles of the disclosure.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
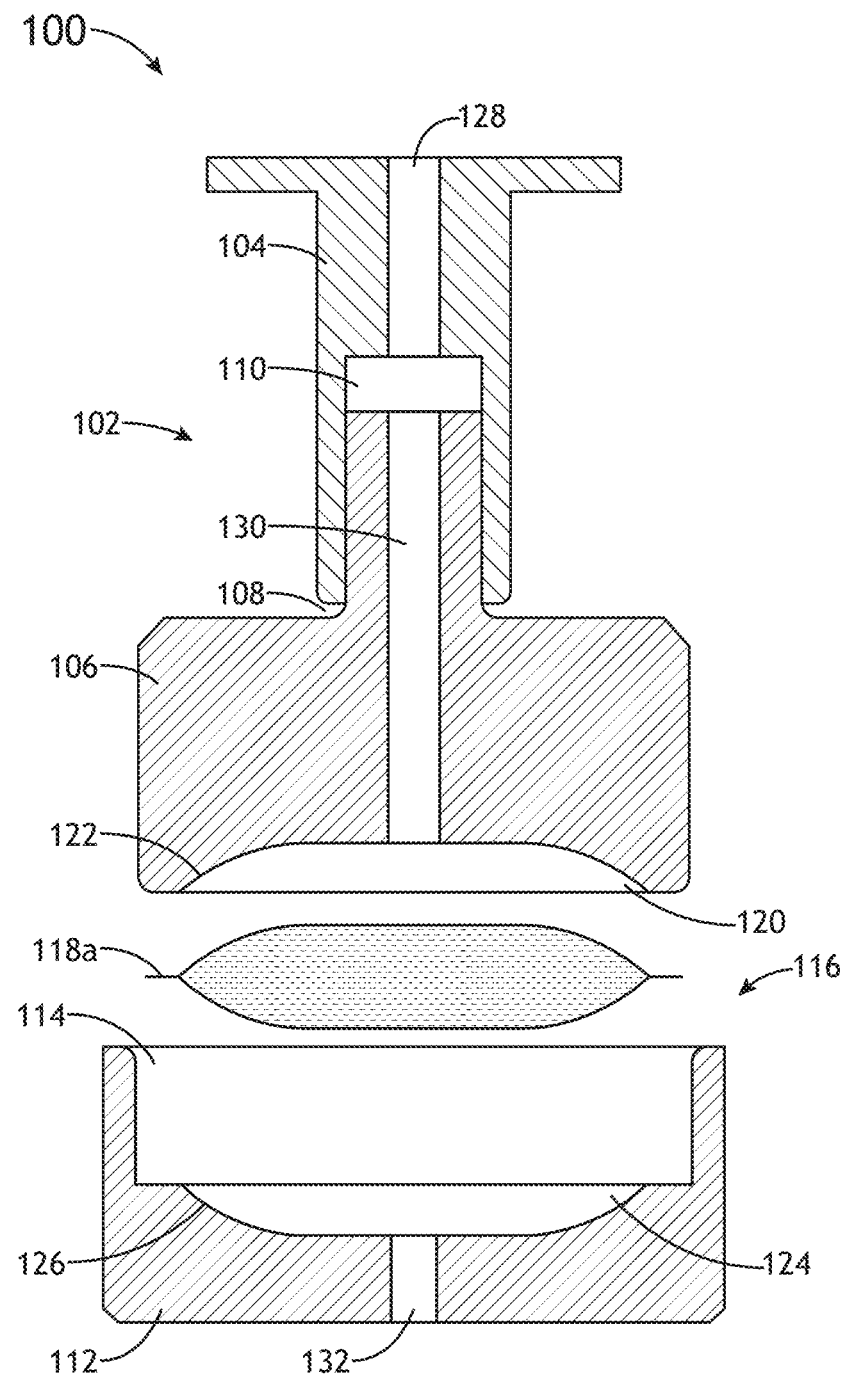
FIG. 1 is a partial cross-section view of an exemplary embodiment of the brew head assembly, according to the inventive concepts disclosed herein.

Reference will now be made in detail to the subject matter disclosed, which is illustrated in the accompanying drawings.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

FIGS. 1-6 generally illustrate exemplary embodiments of a brew head assembly, according to the inventive concepts disclosed herein.

Broadly, embodiments of the inventive concepts disclosed herein are directed to a brew head assembly. More particularly, embodiments of the inventive concepts disclosed herein are directed to a brew head assembly, where the brew head assembly is configured to receive a brew pod and adjust the size of a brew cavity within the brew head assembly to ensure parameters known to generate a particular brew product are met.

FIGS. 1-3B generally illustrate exemplary embodiments of a brew head assembly 100 according to the inventive concepts disclosed herein.

Figure 6:
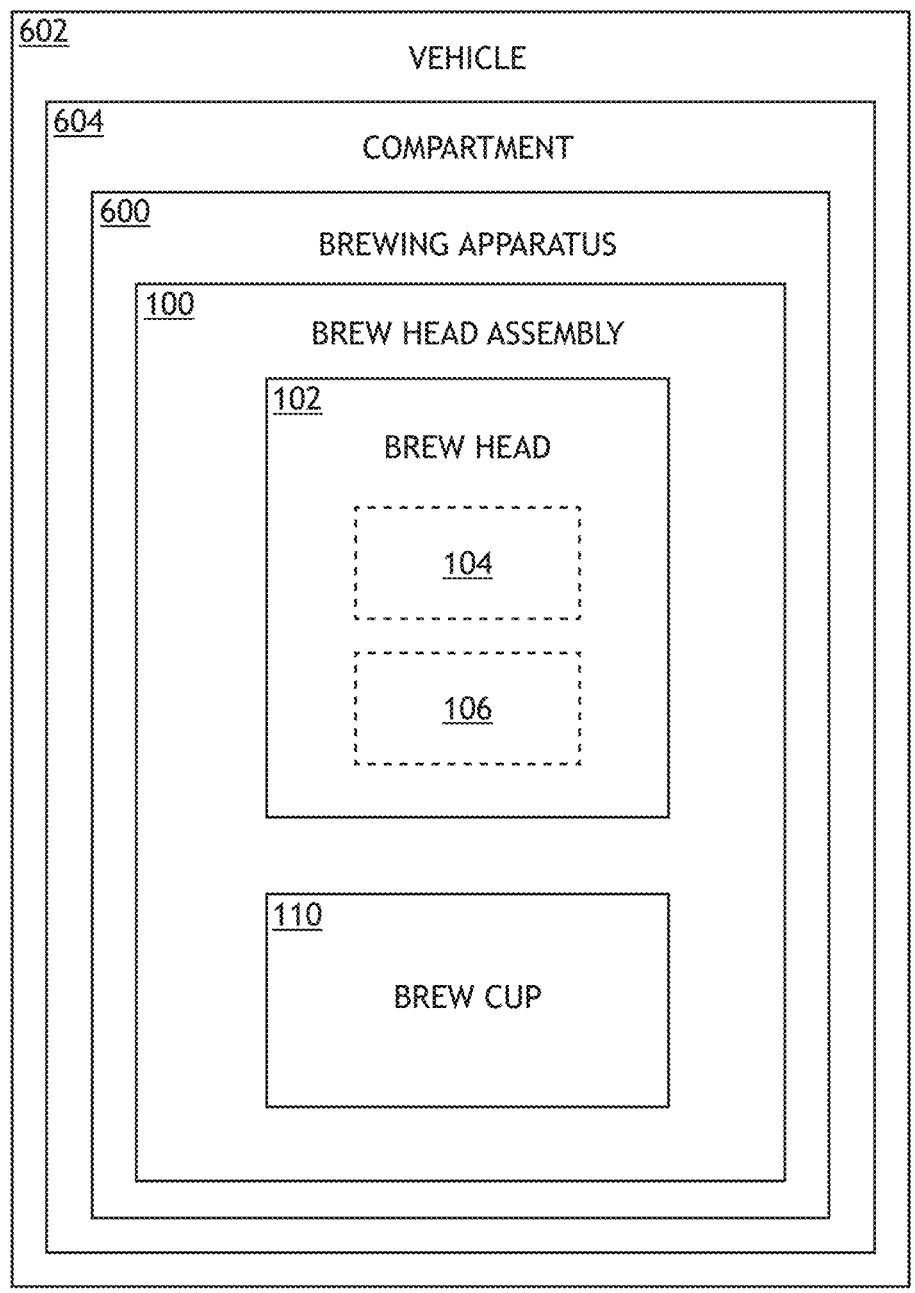
FIG. 6 illustrates a diagrammatic illustration of an exemplary embodiment of a brewing apparatus including the brew head assembly, according to the inventive concepts disclosed herein.

The brew head assembly 100 may be a component of a brewing apparatus (e.g., brewing apparatus 600, as illustrated in FIG. 6). It is noted herein that "brew head assembly 100," "adjustable brew head assembly 100," or "assembly 100" may be considered equivalent, for purposes of the present disclosure.

The brew head assembly 100 may include an adjustable assembly 102. The adjustable assembly 102 may include a support member 104 and a brew head 106. At least a portion of the support member 104 and the brew head 106 may be separated a select distance by a gap 108. For example, a lead edge of the support member 104 and an exterior surface of the brew head 106 may be separated a select distance by the gap 108.

One or more interior surfaces of the support member 104 may define a brew head cavity 110. At least a portion of the support member 104 and the brew head 106 may be separated a select distance within the brew head cavity 110. For example, a bottom interior surface of the support member 104 and a top surface of the brew head 106 may be separated a select distance (e.g., separated by a gap) within the brew head cavity 110. The brew head 106 may be dimensioned to be at least partially inserted into the brew head cavity 110. For example, the width or diameter of the brew head cavity 110 may be greater than the width or diameter of at least a portion of the brew head 106. By way of another example, the length of the brew head cavity 110 may be greater than the length of at least a portion of the brew head 106. For instance, where the length of the brew head cavity 110 is greater than the length of at least a portion of the brew head 106, the brew head 106 may be adjustable relative to the support member 104.

A seal (e.g., O-ring, gasket, or the like) may be inserted between the interior surface of the support member 104 and the exterior surface of the brew head 106 to prevent fluid leakage from the brew head cavity 110 during a brew. It is noted herein, however, that the diameter or width of the support member 104 and the width or diameter of the exterior surface of the brew head 106 may be toleranced to prevent fluid leakage from the brew head cavity 110 during a brew, such that the seal may not be necessary. Therefore, the above description should not be interpreted as a limitation on the present disclosure but merely an illustration.

Although the present disclosure illustrates the support member 104 and the brew head 106 as separate components, it is noted herein that the support member 104 and the brew head 106 may be fabricated as a single component of the adjustable assembly 102. In addition, it is noted herein the adjustable assembly 102 may have components in addition to the support member 104 and the brew head 106. Therefore, the above description should not be interpreted as a limitation on the present disclosure but merely an illustration.

The brew head assembly 100 may include a brew cup 112. The brew cup 112 may be removable from the brewing apparatus. For example, the brew cup 112 may be inserted within a cavity defined in the brewing apparatus and seated within a brew tray coupled to the brewing apparatus (e.g., to the brewing apparatus 600, as illustrated in FIG. 6). It is noted herein, however, that the brew cup 112 may be coupled to the brewing apparatus in a manner preventing the removal of the brew cup 112 from the brewing apparatus. Therefore, the above description should not be interpreted as a limitation on the present disclosure but merely an illustration.

One or more interior surfaces of the brew cup 112 may define a brew head cavity 114. The brew head 106 may be dimensioned to be at least partially inserted into the brew head cavity 114. For example, the width or diameter of the brew head cavity 114 may be greater than the width or diameter of at least a portion of the brew head 106. By way of another example, the length of the brew head cavity 114 may be greater than the length of at least a portion of the brew head 106. For instance, where the length of the brew head cavity 114 is greater than the length of at least a portion of the brew head 106, the brew head 106 may be adjustable relative to the brew cup 112.

A seal (e.g., O-ring, gasket, or the like) may be inserted between the interior surface of the brew cup 112 and the exterior surface of the brew head 106 to prevent fluid leakage from the brew head cavity 114 during a brew. It is noted herein, however, that the diameter or width of the brew cup 112 and the width or diameter of the exterior surface of the brew head 106 may include a tolerance selected to prevent fluid leakage from the brew head cavity 114 during a brew, such that the seal may not be necessary. Therefore, the above description should not be interpreted as a limitation on the present disclosure but merely an illustration.

The brew head assembly 100 may include a pod cavity 116 proximate to the brew head cavity 114. The pod cavity 116 may be configured to receive a brew pod 118a. For example, the brew pod 118a may include, but is not limited to, a packet, pouch, filter pod, cup, capsule, or any other device configured to hold a drink product typically used when brewing (e.g., coffee grounds, tea leaves, drink powder, or the like).

Different brew pods (e.g., different-branded brew pods) may include one or more different dimensions (e.g., in the size or shape). For example, the brew head assembly 100 may include the gap 108 between the support member 104 and the brew head 106 to allow for adjustment of the brew head 106 based on the dimensions of the brew pod 118a. By way of another example, the brew head assembly 100 may include a gap between the support member 104 and the brew head 106 within the brew head cavity 110 to allow for adjustment of the brew head 106 based on the dimensions of the brew pod 118a. With the adjustment, a tight tolerance between the brew head 106, the brew cup 112, and the brew pod 118a may be maintained regardless of the dimensions of the particular brew pod 118a inserted into the brew head assembly 100. In this regard, drinks requiring select brewing conditions (e.g., espresso requiring select pressures during extraction) may be maintained at a desirable quality (e.g., have a desired taste), regardless of the brew pod 118a used.

Although the present disclosure is directed to the brew head assembly 100 including the gap 108 and the gap within the brew cavity 110, it is noted herein that the brew head assembly 100 may include places for adjustment in addition to or instead of the gap 108 and/or the gap within the brew cavity 110, such that the brew head assembly 100 may not include the gap 108 and/or the gap within the brew cavity 110. Therefore, the above description should not be interpreted as a limitation on the present disclosure but merely an illustration.

The pod cavity 116 may be defined within either the brew head 106 or the brew cup 112. In the alternative, the pod cavity 116 may be defined within both the brew head 106 and the brew cup 112. For example, a first portion 120 of the pod cavity 116 may be defined within the brew head 106. For instance, the first portion 120 may include one or more contours 122 that map to one or more contours of the brew pod 118a. By way of another example, a second portion 124 of the pod cavity 116 may be defined within the brew cup 112. For instance, the second portion 124 may include one or more contours 126 that map to one or more contours of the brew pod 118a. It is noted herein that mapping the pod cavity 116 to the brew pod 118a (e.g., via the one or more contours 122 and the one or more contours 126) may allow pressure within the brew head cavity 114 to be more closely regulated during the brewing process.

The brew head assembly 100 may include one or more fluid channels configured to accept and/or discharge a fluid (e.g., water, or a brewed product such as coffee, espresso, tea, hot chocolate, or the like). For example, the support member 104 may include a fluid channel 128 that accepts a fluid (e.g., water) from a fluid pipe or fluid reservoir within the brewing apparatus and discharges the fluid into the brew head cavity 110. By way of another example, the brew head 106 may include a fluid channel 130 that accepts a fluid (e.g., water) from the brew head cavity 110 and discharges the fluid into the brew head cavity 114. By way of another example, the brew cup 112 may include a fluid channel 132 that accepts a fluid (e.g., a brewed product) and discharges the brewed product out of the brew head assembly 100 (e.g., into a cup, a carafe/server, or the like).

Although the present disclosure illustrates the brew head assembly 100 as including the fluid channels 128, 130, and 132, it is noted herein that the brew head assembly 100 may include only a subset of the fluid channels 128, 130, and 132. For example, the fluid channel 130 may receive fluid from a fluid pipe or fluid reservoir directly, such that the fluid channel 128 through the support member 104 may not be necessary. Therefore, the above description should not be interpreted as a limitation on the present disclosure but merely an illustration.

Figure 4:
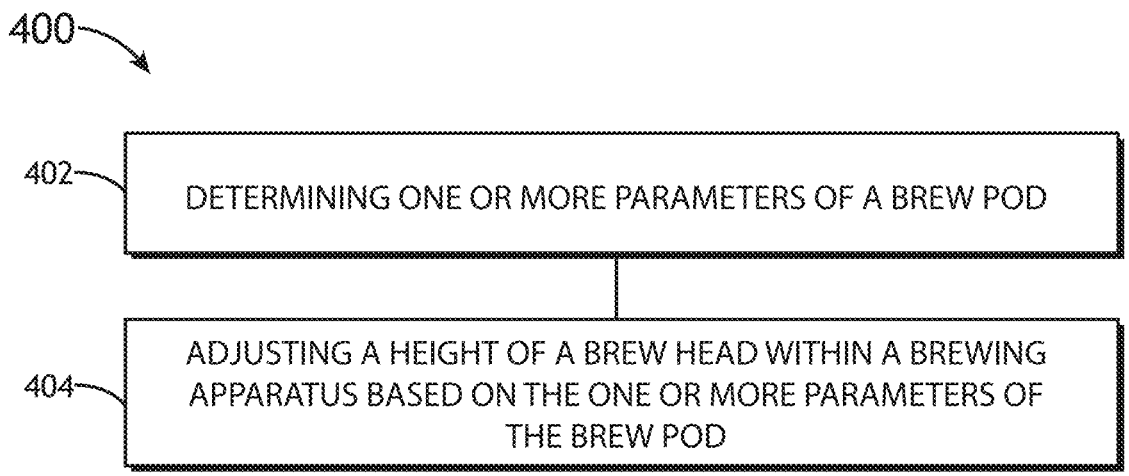
FIG. 4 illustrates a flowchart of an exemplary method for adjustment of the brew head assembly, according to the inventive concepts disclosed herein.

FIG. 4 illustrates a method 400 for adjustment of the brew head assembly 100, according to the inventive concepts disclosed herein. In one example, the method 400 may be implemented by a brewing apparatus (e.g., the brewing apparatus 600, as illustrated in FIG. 6) including the brew head assembly 100.

A step 402 may include determining one or more parameters of a brew pod. For example, the one or more parameters may include, but are not limited to, one or more brew pod dimensions of the brew pod 118a. For instance, the one or more brew pod dimensions may include, but are not limited to, width or diameter, length, or thickness. By way of another example, the one or more parameters may include, but are not limited to, one or more brewing parameters related to the drink product (e.g., grounds, leaves, powder, or the like) within the brew pod 118a. For instance, the one or more brewing parameters may include, but are not limited to, brewing pressure, brewing temperature, fluid volume during steeping, or the like. The one or more parameters may be received from a manufacturer or a supplier of the brew pod. It is noted herein, however, that the one or more parameters may be obtained via in-house measurements.

A step 404 may include adjusting a height of a brew head of an adjustable assembly within a brewing apparatus based on the one or more parameters of the brew pod. The adjustable assembly 102 may include one or more adjustable components (e.g., rails, tracks, fasteners, gears, notches, slots, grooves, or the like) to adjust the height of the brew head 106 when in a compressed or closed position based on the brand of brew pod. For example, the brew head 106 may be raised or lowered via the one or more adjustable components such that the height between the brew head 106 and the brew cup 112 when the adjustable assembly 102 is in the compressed or closed position conforms with the one or more parameters of the brew pod 118a. For example, the height between the brew head 106 and the brew cup 112 may be defined as the distance between a down-facing or bottom surface of the brew head 106 and an up-facing or top surface of the brew cup 112 within the second brew head cavity 114.

The height between the brew head 106 and the brew cup 112 may be any of a range of heights, where the range is large enough to allow the brew head 106 to be set at any height for any known brand of brew pod 118a. For example, the range of heights may correspond to (e.g., be defined by) a select distance that components of the brew head assembly 100 (e.g., the support member 104 and the brew head 106 of the adjustable assembly 102) are separated by one or more gaps (e.g., the gap 108 and/or the gap within the brew head cavity 110). It is noted herein the brew head 106 may be moveable or settable between any two heights within the range of heights.

The one or more adjustable components may be integrated within the brew head assembly 100 such that the height between the brew head 106 and the brew cup 112 when the adjustable assembly 102 is in the compressed or closed position may only be set by a manufacturer of the brewing apparatus including the brew head assembly 100. For example, a user of the brewing apparatus including the brew head assembly 100 may only use a particular brand or style of brew pod, such that the user may only require one height for the brew head 106 until the user changes the brand or style of brew pod used. In this example, the user may request the manufacturer set and/or adjust the height between the brew head 106 and the brew cup 112 when the adjustable assembly 102 is in the compressed or closed position based on the particular brand of brew pod 118a used. It is noted herein, however, that the one or more adjustment components may be integrated within the brew head assembly 100 such that the height between the brew head 106 and the brew cup 112 when the adjustable assembly 102 is in the compressed or closed position may be set by the user of the brewing apparatus including the brew head assembly 100 as desired.

Figure 2:
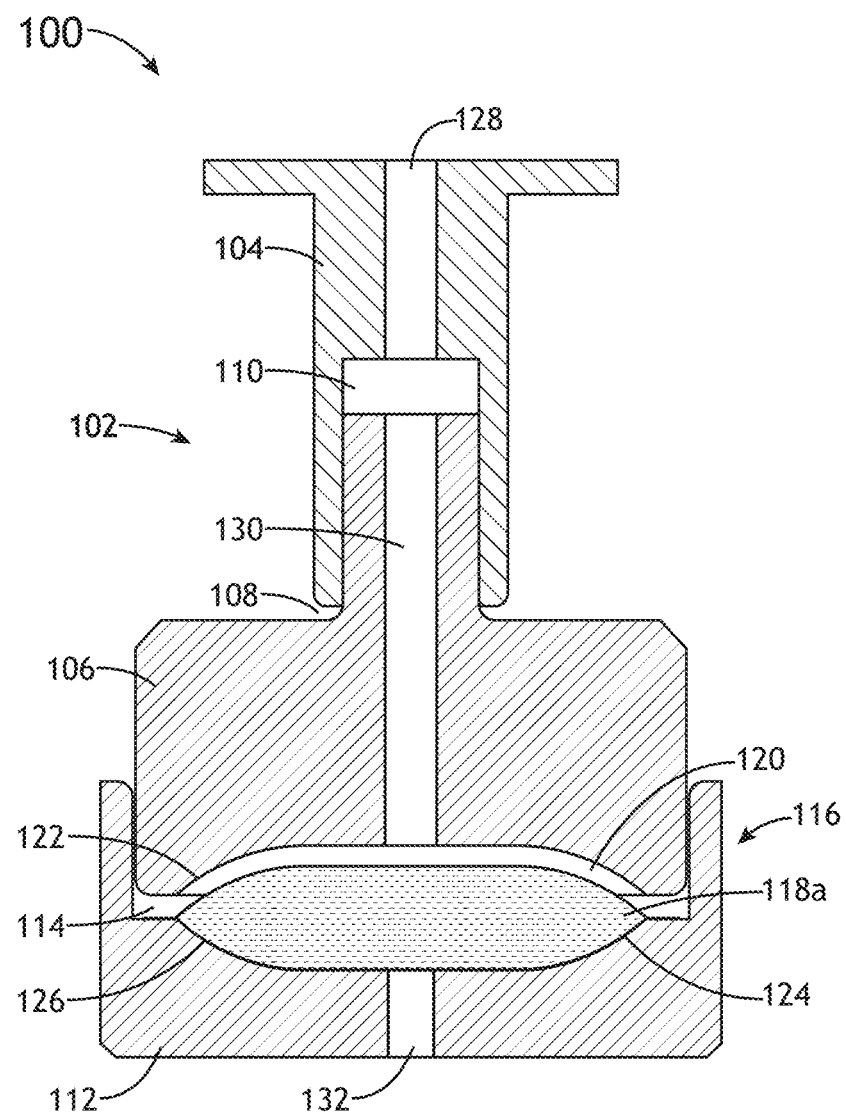
FIG. 2 is a partial cross-section view of an exemplary embodiment of the brew head assembly, according to the inventive concepts disclosed herein.

It is noted herein that FIG. 2 illustrates an exemplary embodiment of the brew head 106 of the adjustable assembly 102 at an incorrectly-adjusted height when in the compressed or closed position for the brew pod 118a illustrated in FIGS. 1-3A, and FIG. 3A illustrates an exemplary embodiment of the brew head 106 of the adjustable assembly 102 at a correctly-adjusted height when in the compressed or closed position for the brew pod 118a illustrated in FIGS. 1-3A.

In addition, it is noted herein that the incorrectly-adjusted height illustrated in FIG. 2 for the brew pod 118a illustrated in FIGS. 1-3A may be a correctly-adjusted height when in the compressed or closed position for a different brew pod 118b including one or more different parameters. For example, the different brew pod 118b may be of a size where it comes into contact with the portion 120 of the pod cavity 116 and the portion 124 of the pod cavity 116 as illustrated in FIG. 3B, in a manner similar to how the brew pod 118a illustrated in FIGS. 1-3A comes into contact with the portion 120 of the pod cavity 116 and the portion 124 of the pod cavity 116 illustrated in FIG. 3A.

It is noted herein that any embodiment or description directed to the brew pod 118a may be directed to the brew pod 118b. Therefore, the above description should not be interpreted as a limitation on the present disclosure but merely an illustration.

Figure 5:
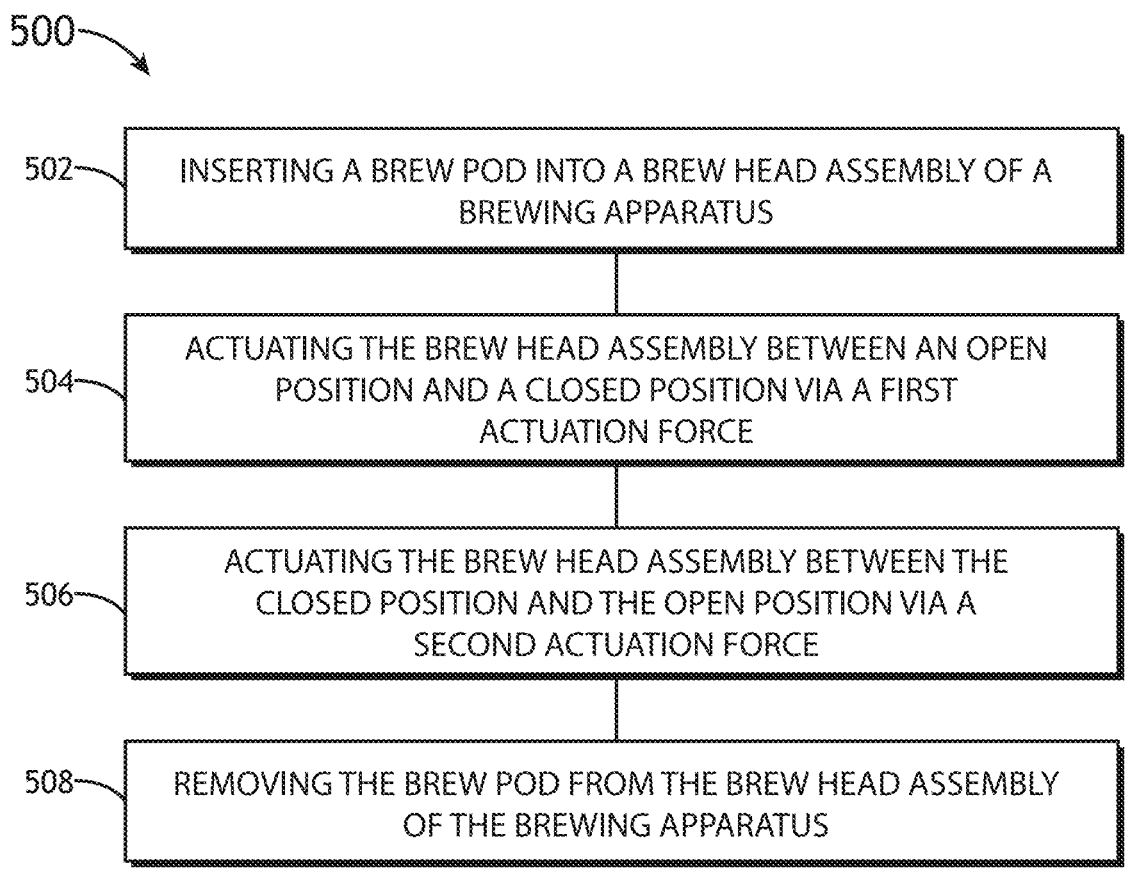
FIG. 5 illustrates a flowchart of an exemplary method for operation of the brew head assembly, according to the inventive concepts disclosed herein.

FIG. 5 illustrates a method 500 for operation of the brew head assembly 100, according to the inventive concepts disclosed herein. In one example, the method 500 may be implemented by a brewing apparatus (e.g., the brewing apparatus 600, as illustrated in FIG. 6) including the brew head assembly 100.

A step 502 may include inserting a brew pod into a brew head assembly of a brewing apparatus. For example, the brew cup 112 may be removed from the brew head assembly 100, the brew pod 118a may be inserted into the brew cup 112, and the brew cup 112 may be inserted back into the brew head assembly 100. By way of another example, the brew cup 112 is not removable. In this example, the brewing apparatus may include a slot configured to receive the brew pod 118a. In addition, the brewing apparatus may include a track configured to deposit the brew pod 118a into the brew cup 112.

A step 504 may include actuating an adjustable assembly of the brew head assembly between an open position and a closed position via a first actuation force. For example, the open position may be a position where the adjustable assembly 102 is raised and the brew cup 112 is configured to receive the brew pod 118a. By way of another example, the compressed or closed position may be a position where the brew head is lowered to the correctly-adjusted height for the brew pod 118a and the brewing apparatus is utilized to produce a brewed product (e.g., coffee, espresso, tea, or the like). A step 506 may include actuating the adjustable assembly of the brew head assembly between the closed position and the open position via a second actuation force.

Figure 3A:
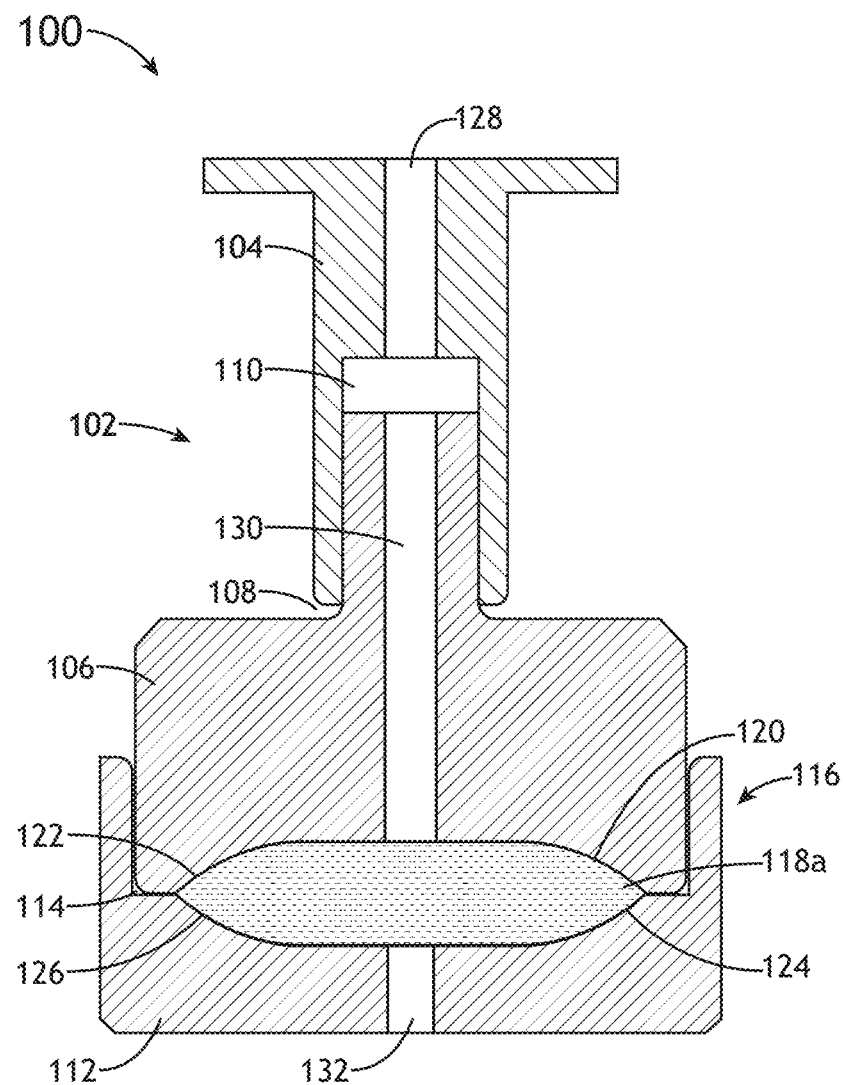
FIG. 3A is a partial cross-section view of an exemplary embodiment of the brew head assembly, according to the inventive concepts disclosed herein.
Figure 3B:
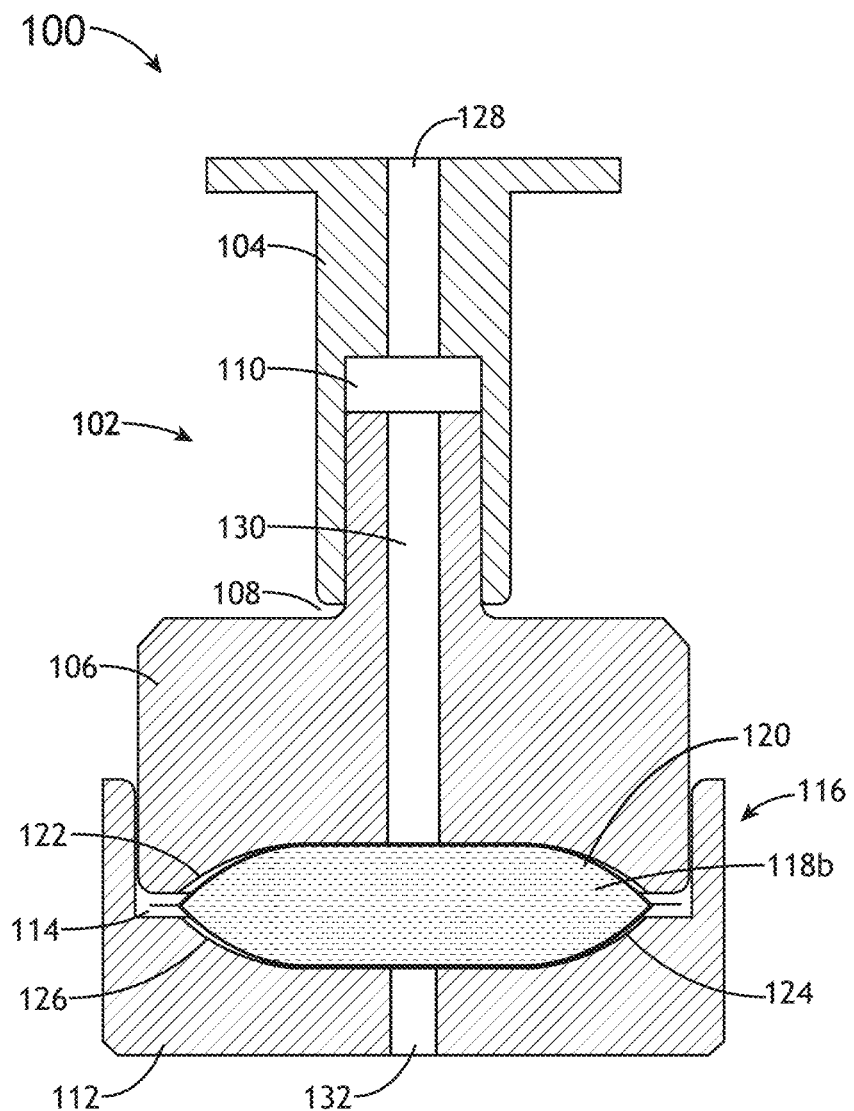
FIG. 3B is a partial cross-section view of an exemplary embodiment of the brew head assembly, according to the inventive concepts disclosed herein.

It is noted herein that FIG. 1 illustrates an exemplary embodiment of the brew head 106 of the adjustable assembly 102 in the open position, FIG. 3A illustrates an exemplary embodiment of the brew head 106 at a correctly-adjusted height when in the compressed or closed position for the brew pod 118a illustrated in FIGS. 1-3A, and FIG. 2 illustrates an exemplary embodiment of the brew head 106 at an incorrectly-adjusted height when in the compressed or closed position for the brew pod 118a illustrated in FIGS. 1-3A (or a correctly-adjusted height when in a compressed or closed position for the brew pod 118b illustrated in FIG. 3B).

The adjustable assembly 102 may be actuated relative to the brew cup 112. For example, the brew cup 112 may be secured in place within the brewing apparatus (e.g., seated within a brew tray or the brewing apparatus, coupled to the brewing apparatus, or the like), while the brew head 106 of the adjustable assembly 102 moves within the brew head cavity 114 in response to an applied force (e.g., the first actuation force, the second actuation force, or the like).

The first actuation force and/or the second actuation force may be provided by a user of the brewing apparatus including the brew head assembly 100. It is noted herein, however, that the first actuation force and/or the second actuation force may be generated via one or more motor assemblies. For example, the one or more motor assemblies may be electrically coupled to and driven by a controller. For instance, the controller may be integrated within and/or coupled to the brewing apparatus including the brew head assembly 100. By way of another example, the motor assembly may be driven by water pressure supplied by a brew pump within the brewing apparatus.

The adjustable assembly 102 may include and/or be coupled to a linkage assembly (e.g., knee-over-linkage assembly) or cam assembly, where movement within the linkage assembly or cam assembly when the first actuation force and/or the second actuation force is configured to cause the actuation of one or more components of the adjustable assembly 102 (e.g., the support member 104 and/or the brew head 106). For example, the support member 104 may come into contact with the brew head 106 when the first actuation force is applied, causing the actuation of the brew head 106 from the open position to the compressed or closed position. For instance, the actuation caused by contact between the support member 104 and the brew head 106. By way of another example, the support member 104 may pull against the brew head 106 when the second actuation force is applied, causing the actuation of the brew head 106 from the compressed or closed position to the open position.

The linkage assembly or cam assembly may be configured to secure one or more components of the adjustable assembly 102 (e.g., the support member 104 and/or the brew head 106) in a particular position following the application of the actuation force.

Although the present disclosure is directed to actuation forces being applied to actuate one or more components of the adjustable assembly 102 (e.g., the support member 104 and/or the brew head 106) via linkage assemblies, cam assemblies, or direct contact, it is noted herein that the first and second actuation forces may interact with the one or more components of the adjustable assembly 102 (e.g., the support member 104 and/or the brew head 106) in a manner different than previously described. Therefore, the above description should not be interpreted as a limitation on the present disclosure but merely an illustration.

A step 508 may include removing the brew pod from the brew head assembly of the brewing apparatus. For example, the brew cup 112 may be removed from the brew head assembly 100, the brew pod 118a may be removed from the brew cup 112, and the brew cup 112 may be inserted back into the brew head assembly 100. By way of another example, the brew cup 112 is not removable. In this example, the brewing apparatus may include a tray or slot configured to receive a used brew pod 118a. In addition, the brewing apparatus may include a track configured to deposit the used brew pod 118a into a receptacle either within the brewing apparatus or proximate to the brewing apparatus.

FIG. 6 illustrates a diagrammatic illustration of an exemplary embodiment of the brewing apparatus 600 including the brew head assembly 100, according to the inventive concepts disclosed herein.

The brew head assembly 100 may be integrated into and/or configured to operate in the brewing apparatus 600. For example, the brewing apparatus 600 may include, but is not limited to, an espresso maker, a coffeemaker, a tea brewer, or the like.

The brew head assembly 100 may be coupled to one or more components of and/or integrated into a brewing system of the brewing apparatus 600. The brewing system may include one or more heating subsystems with any number heating components known in the art (e.g., one or more heating elements, one or more heat-resistant components, or the like), one or more plumbing subsystems with any number of plumbing components known in the art (e.g., fluidic components including one or more manifolds, one or more solenoid valves, one or more pipes and pipe couplers, one or more tubes and tube couplers, or the like), and/or one or more electrical subsystems with any number of electrical components known in the art (e.g., one or more wire harnesses, one or more terminal blocks, one or more sensors, one or more controllers including processors and/or memory, one or more user interfaces, or the like). It is noted herein the various systems and subsystems within the brewing apparatus 600 may share any number of components.

The brewing apparatus 600 may be installed in and/or configured or dimensioned to fit within any type of vehicle 602 known in the art. For example, the vehicle 602 may be any air, land, or water-based personal equipment or vehicle; any air, land, or water-based commercial equipment or vehicle; any air, land, or water-based military equipment or vehicle known in the art. For instance, the vehicle 602 may be a passenger aircraft. The vehicle 602 may include a compartment 604 in which the brewing apparatus is installed and/or configured or dimensioned to fit. For example, the compartment 604 may include a compartment in a galley of a passenger aircraft. The vehicle 602 may include one or more on-board systems (e.g., water storage reservoirs, water sanitation systems, controllers in communication with the brewing apparatus, or the like) coupled to the brewing apparatus 600.

Where the vehicle 602 is an aircraft, the brewing apparatus 600 and/or select components of the brewing apparatus 600 may be configured in accordance with guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is noted herein the brewing apparatus 600 may be installed directly within the vehicle 602 (e.g., not installed and/or configured or dimensioned to fit the compartment 604 of the vehicle 602). In addition, it is noted herein the brewing apparatus 600 may be a standalone device configured to operate within a home or a business. For example, the brewing apparatus 600 may be a device sold for commercial or industrial use in either a home or a business. In this regard, the brewing apparatus 600 may not be installed and/or configured or dimensioned to fit within the compartment 604 of the vehicle 602. Therefore, the above description should not be interpreted as a limitation on the present disclosure but merely an illustration.

As will be appreciated from the above embodiments, the inventive concepts disclosed herein are directed to a brew head assembly, where the brew head assembly is configured to receive a brew pod and adjust the size of a brew cavity within the brew head assembly to ensure parameters known to generate a particular brewed product are met.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A brew head assembly, comprising:
an adjustable assembly, comprising:
a brew head; and
a support member, the support member defining a first brew head cavity, a first portion of the brew head being of a first width and a first length, the first width less than a width of the first brew head cavity, the first length less than a length of the first brew head cavity, the first portion at least partially inserted into the first brew head cavity, a second portion of the brew head being of a second width greater than the width of the first brew head cavity and positioned exterior to the first brew head cavity,
the adjustable assembly being actuatable between an open position and at least one closed position; and
a brew cup, the brew cup defining a second brew head cavity, the second width of the second portion of the brew head being less than a width of the second brew head cavity, the second portion at least partially inserted into the second brew head cavity,
a height between a surface of the brew head configured to receive a brew pod of a plurality of brew pods and an interior surface of the second brew head cavity defined within the brew cup when the adjustable assembly is in the at least one closed position being adjustable to maintain one or more parameters of the brew pod of the plurality of brew pods within the second brew head cavity, the one or more parameters including brewing pressure,
the brew head assembly being insertable within a brewing apparatus dimensioned to fit within a compartment in a galley of an aircraft.

2. The assembly in claim 1, the one or more parameters of the brew pod of the plurality of brew pods including one or more brew pod dimensions.

3. The assembly in claim 1, brewing pressure being one of a plurality of brewing parameters of the brew pod of the plurality of brew pods.

4. The assembly in claim 1, the height between the surface of the brew head and the interior surface of the second brew head cavity defined within the brew cup being a distance between a bottom surface of the brew head and a top surface of the brew cup.

5. The assembly in claim 1, the height between the surface of the brew head and the interior surface of the second brew head cavity defined within the brew cup being a first height between the brew head and the brew cup when the adjustable assembly is in a first closed position of the at least one closed position, the first height being responsive to one or more parameters of a first brew pod of the plurality of brew pods.

6. The assembly in claim 5, the height between the surface of the brew head and the interior surface of the second brew head cavity defined within the brew cup being a second height between the brew head and the brew cup when the adjustable assembly is in a second closed position of the at least one closed position, the second height being responsive to one or more parameters of a second brew pod of the plurality of brew pods.

7. The assembly in claim 6, the adjustable assembly being moveable between the first height and the second height.

8. The assembly in claim 6, the first height and the second height being within a range of heights corresponding to a select distance of at least one gap separating the brew head and the support member, the at least one gap including a first gap between the support member and the brew head within the first brew head cavity and a second gap between a lead edge of the support member and an exterior surface of the brew head,
the at least one gap allowing for adjustment of the brew head based on the one or more parameters of the brew pod of the plurality of brew pods.

9. The assembly in claim 1, further comprising:
a pod cavity defined within one or more of the brew cup or the brew head.

10. The assembly in claim 9, the pod cavity including one or more contours configured to map to one or more contours of the brew pod of the plurality of brew pods.

11. The assembly in claim 9, the pod cavity being defined within the brew cup.

12. The assembly in claim 9, the pod cavity being defined within the brew head.

13. The assembly in claim 9, a first portion of the pod cavity being defined within the brew cup, a second portion of the pod cavity being defined within the brew head.

14. The assembly in claim 9, the pod cavity being proximate to the second brew head cavity.

15. The assembly in claim 14, further comprising:
one or more fluid channels through at least one of the adjustable assembly or the brew cup.

16. The assembly in claim 15, further comprising:
a fluid channel of the one or more fluid channels through the support member, the fluid channel being configured to receive a fluid and provide the fluid to the first brew head cavity.

17. The assembly in claim 15, further comprising:
a fluid channel of the one or more fluid channels through the brew head, the fluid channel being configured to receive a fluid and provide the fluid to the second brew head cavity.

18. The assembly in claim 15, further comprising:
a fluid channel of the one or more fluid channels through the brew head, the fluid channel being configured to receive a brewed product from the second brew head cavity and discharge the brewed product.

19. A brew head assembly, comprising:
an adjustable assembly, comprising:
a brew head; and
a support member, the support member defining a first brew head cavity, a first portion of the brew head being of a first width and a first length, the first width less than a width of the first brew head cavity, the first length less than a length of the first brew head cavity, the first portion at least partially inserted into the first brew head cavity, a second portion of the brew head being of a second width greater than the width of the first brew head cavity and positioned exterior to the first brew head cavity,
the adjustable assembly being actuatable between an open position and at least one closed position; and
a brew cup, the brew cup defining a second brew head cavity, the second width of the second portion of the brew head being less than a width of the second brew head cavity, the second portion at least partially inserted into the second brew head cavity,
a height between a surface of the brew head configured to receive a brew pod of a plurality of brew pods and an interior surface of the second brew head cavity defined within the brew cup when the adjustable assembly is in the at least one closed position being adjustable to maintain one or more parameters of the brew pod of the plurality of brew pods within the second brew head cavity, the one or more parameters including brewing pressure, the brew head assembly being insertable within a brewing apparatus dimensioned to fit within a vehicle.

20. A brew head assembly, comprising:

an adjustable assembly, comprising:
- a brew head; and
- a support member, the support member defining a first brew head cavity, a first portion of the brew head being of a first width and a first length, the first width less than a width of the first brew head cavity, the first length less than a length of the first brew head cavity, the first portion at least partially inserted into the first brew head cavity, a second portion of the brew head being of a second width greater than the width of the first brew head cavity and positioned exterior to the first brew head cavity, the adjustable assembly being actuatable between an open position and at least one closed position; and a brew cup, the brew cup defining a second brew head cavity, the second width of the second portion of the brew head being less than a width of the second brew head cavity, the second portion at least partially inserted into the second brew head cavity, a height between a surface of the brew head configured to receive a brew pod of a plurality of brew pods and an interior surface of the second brew head cavity defined within the brew cup when the adjustable assembly is in the at least one closed position being adjustable to maintain one or more parameters of the brew pod of the plurality of brew pods within the second brew head cavity, the one or more parameters including brewing pressure, the brew head assembly being insertable within a brewing apparatus.

* * * * *